(12) United States Patent
Wolff

(10) Patent No.: US 12,213,490 B2
(45) Date of Patent: *Feb. 4, 2025

(54) GRINDER ASSEMBLY

(71) Applicant: James B. Wolff, Portland, OR (US)

(72) Inventor: James B. Wolff, Portland, OR (US)

(73) Assignees: Formtec, LLC, Plymouth, WI (US); Spherical IP, LLC, Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/999,099

(22) Filed: Jan. 13, 2014

(65) Prior Publication Data

US 2015/0196038 A1    Jul. 16, 2015

(51) Int. Cl.
*A22C 17/02* (2006.01)
*A22C 17/00* (2006.01)
*B02C 18/30* (2006.01)
*B02C 18/36* (2006.01)

(52) U.S. Cl.
CPC ........ *A22C 17/0026* (2013.01); *B02C 18/302* (2013.01); *B02C 18/365* (2013.01)

(58) Field of Classification Search
CPC . A22C 17/0026; B02C 18/302; B02C 18/365; B02C 18/301; B02C 18/30; B02C 2018/367
USPC ...................................... 366/163.2
See application file for complete search history.

(56) References Cited

U.S. PATENT DOCUMENTS

| | | | | |
|---|---|---|---|---|
| 3,723 A | * | 8/1844 | Clark | B02C 13/284 241/95 |
| 1,007,016 A | * | 10/1911 | Weir | B29B 17/02 241/74 |
| 1,130,024 A | * | 3/1915 | Schock | B02C 18/302 241/82.7 |
| 1,130,025 A | * | 3/1915 | Schock | B02C 18/302 241/82.7 |
| 1,514,271 A | * | 11/1924 | Tilden | B02C 18/365 241/82.5 |
| 1,796,677 A | * | 3/1931 | Wilson | B02C 18/302 452/45 |
| 1,969,589 A | * | 8/1934 | Tanzi | A21C 11/00 264/148 |
| 2,953,461 A | * | 9/1960 | Prohaska | A22C 11/001 426/246 |
| 3,147,785 A | * | 9/1964 | Schnell | B02C 18/30 241/282.1 |
| 3,762,658 A | * | 10/1973 | Barnes | B02C 18/365 241/82.5 |
| 3,793,466 A | * | 2/1974 | Kawkins et al. | 426/274 |
| 3,878,992 A | * | 4/1975 | MacManus | A23G 3/28 239/553 |

(Continued)

FOREIGN PATENT DOCUMENTS

EP        0720816 A1 *  7/1996

OTHER PUBLICATIONS

Tech-FAQ; The Venturi Effect; www.tech-faq.com/venturi-effect.html; p. 1.*

(Continued)

*Primary Examiner* — Emmanuel S Luk

(74) *Attorney, Agent, or Firm* — Philip M. Weiss; Weiss & Weiss

(57) ABSTRACT

A grinder with independent blades and an apparatus and methods to cause the product to be stretched, aligning the fibers of the product.

4 Claims, 6 Drawing Sheets

(56) References Cited

U.S. PATENT DOCUMENTS

| | | | | |
|---|---|---|---|---|
| 3,903,315 A * | 9/1975 | Giles et al. | | 426/388 |
| 4,088,433 A * | 5/1978 | Simpson | | B29C 48/05 |
| | | | | 425/464 |
| 4,205,415 A | 6/1980 | Orchard | | |
| 4,335,965 A * | 6/1982 | Faverty | | B01F 13/00 |
| | | | | 118/303 |
| 4,422,582 A * | 12/1983 | Roeger | | B02C 18/36 |
| | | | | 241/82.5 |
| 4,479,614 A * | 10/1984 | Bernard | | B02C 18/30 |
| | | | | 241/82.2 |
| 4,700,899 A * | 10/1987 | Powers | | A22C 7/00 |
| | | | | 241/30 |
| 4,842,777 A * | 6/1989 | Lamort | | B01F 5/0415 |
| | | | | 209/170 |
| 4,845,952 A * | 7/1989 | Beebe | | B01F 5/0415 |
| | | | | 60/737 |
| 4,865,820 A * | 9/1989 | Dunster | | C01B 3/386 |
| | | | | 422/220 |
| 4,981,711 A * | 1/1991 | Kearns | | B29B 7/487 |
| | | | | 426/805 |
| 5,289,979 A * | 3/1994 | Lesar | | B02C 18/302 |
| | | | | 241/82.6 |
| 5,486,049 A * | 1/1996 | Boatman | | B01F 5/0451 |
| | | | | 366/174.1 |
| 5,577,437 A * | 11/1996 | Hurd | | A23P 30/20 |
| | | | | 285/27 |
| 6,042,466 A * | 3/2000 | Matthews | | A22C 7/0007 |
| | | | | 452/45 |
| 6,644,574 B1 * | 11/2003 | Lauber | | B02C 18/362 |
| | | | | 241/82.5 |
| 2001/0052558 A1 * | 12/2001 | Younker | | B02C 18/365 |
| | | | | 241/82.1 |
| 2007/0090221 A1 * | 4/2007 | Lesar et al. | | 214/82.5 |
| 2007/0166448 A1 * | 7/2007 | Holmes | | A21C 9/04 |
| | | | | 426/582 |
| 2007/0172533 A1 * | 7/2007 | Pinchot | | B29B 9/06 |
| | | | | 425/142 |
| 2008/0317935 A1 * | 12/2008 | Stanley | | A23L 13/428 |
| | | | | 426/638 |
| 2012/0286077 A1 * | 11/2012 | York | | B02C 18/301 |
| | | | | 241/24.16 |
| 2012/0291346 A1 * | 11/2012 | Rose | | A01C 1/04 |
| | | | | 47/57.6 |
| 2012/0324789 A1 * | 12/2012 | Pease | | B01F 25/31243 |
| | | | | 47/62 N |
| 2016/0059945 A1 * | 3/2016 | Arad | | B63H 5/15 |
| | | | | 440/23 |
| 2017/0001695 A1 * | 1/2017 | Lowry | | B63B 35/7926 |
| 2017/0002794 A1 * | 1/2017 | Williams | | F03D 7/0204 |

OTHER PUBLICATIONS

Tech-FAQ; The Venturi Effect; http://www.tech-faq.com/venturi-effect.html; pp. 1-2.*

Energyeducation: http://energyeducation.ca/encyclopedia/Venturi_effect.*

F1insight: http://www.f1insight.co.uk/2013/04/how-diffuser-exhaust-rear-wing-create-downforce-grip-f1.html.*

Flowmaxx: http://www.flowmaxx.com/venturi.htm.*

Mekanizmalar: https://www.youtube.com/watch?v=H3TcLoapJBo.*

Hyperphysics: http://hyperphysics.phy-astr.gsu.edu/hbase/pber.html.*

* cited by examiner

GRINDER ASSEMBLY

RELATED APPLICATIONS

The present application is a continuation-in-part of pending application Ser. No. 13/573,369 filed Sep. 12, 2012 and application Ser. No. 13/573,370 filed Sep. 12, 2012, are continuation-in-parts of application Ser. No. 13/374,441 filed Dec. 29, 2011, Ser. No. 13/374,417, filed Dec. 27, 2011, Ser. No. 13/374,422, filed Dec. 27, 2011, Ser. No. 13/374,421, filed Dec. 27, 2011 and Ser. No. 13/374,423, filed Dec. 27, 2011 which all are a continuation-in-part of application Ser. No. 13/199,910 filed on Sep. 12, 2011.

FIELD OF THE INVENTION

The present invention relates to a grinder with independent blades. The invention further relates to an apparatus and methods to cause the product to be stretched, aligning the fibers of the product.

BACKGROUND OF THE INVENTION

U.S. Pat. No. 4,205,415 relates to a tapered nozzle that slightly compresses a mass of ground frozen meat to form a cohesive mass while retaining the spaghetti-like shape of the ground strands to aerate the cohesive mass. A positive displacement pump forces the meat through a grinding plate and then through the nozzle to a rotating involute knife to form patties of frozen ground meat in a continuous process.

U.S. Pat. No. 4,479,614 relates to a meat grinder that includes a pump that feeds meat particles into a mixing chamber at a constant flow rate. The meat exits into a frusto-conical shaped collection chamber for passage to a grinder plate. A rotating knife with radially extending blades is rotated by a hydraulic motor at a variable rate. The variable flow rate of the particles to chamber and the variable speed of the knife results in a variable particle size output by the grinder plate.

In the prior art, conventional meat grinders have utilized a screw type conveyor for advancing meat particles through a chamber to force them through a grinder plate disposed at the end of the chamber. The grinder plate normally has a plurality of orifices disposed there through for reducing the particulate size of the meat. Normally, grinding is begun with baseball size chunks of meat and then reduced to a desired size which may take several stages of grinding.

Screw type meat grinders require a defined clearance between the screw conveyor and the sides of the chamber through which the meat is passed. This clearance allows the screw conveyor to clear the walls while rotating. However, this clearance allows meat to flow backwards around the screw conveyor under high pressure conditions, thereby reducing the maximum amount of pressure that can be applied to the meat particles at the grinder plate. This pressure limit defines the maximum flow rate of meat that can be passed through a grinder plate. In addition, gristle or bone chips that may be present in the meat may clog the grinder plate and further inhibit grinding.

In grinding the meat to a desired particle size in a large manufacturing environment, it has been necessary to change grinder plates at various stages of the operation. Since it is very difficult to go from a large particulate size to a very small particulate size, a number of stages are necessary. When the meat is output from the grinder plate, it takes on a very "stringy" texture since the fat and meat fibers have a tendency to adhere together along the longitudinal direction. Therefore, the grinding operation requires an additional step to reduce the length of this material. All of these operations must be repeated for each stage of grinding.

The meat industry has attempted to control fiber length during production through multiple designs. The previous best method is a bowl chopper, dependent upon operator control, it is a batch system that slows production.

Meat grinders do not shear fiber to specified lengths. Meat grinders extrude meat using hydraulic pressure forcing product through holes, the internal grinder blades are sweepers that clear holes of material that can plug them. This extrusion process does not control fiber length, it subjects the product to very high pressure and fails to achieve desired product quality. In the prior art, even if the internal grinder blades could be run at a speed designed to cut the fiber to the desired length, it is not possible at this stage of production, for the meat to be stretched and the fibers aligned.

Current forming technology relies on high pressure, speed and complicated material flow pathways which produce a product lacking in quality. High pressure works the meat cells, the higher the pressure the more massaging, squeezing and turbulence of the meat cells takes place. High speed combined with a complicated flow path increases the pressure and turbulence and works the meat product, releasing and mixing myosin/actin from the cells causing the muscle fiber to bind together and contract (protein bind). The contraction takes place during high heat application as in cooking. The action of the meat fiber is to contract in length, this contraction combined with protein bind not only shortens the muscle fiber which if not controlled causes odd cook shapes but a rubber like texture with a tough bite.

In muscle, actin is the major component of thin filaments, which together with the motor protein myosin (which forms thick filaments), are arranged into actomyosin myofibrils. These fibrils comprise the mechanism of muscle contraction. Using the hydrolysis of ATP for energy, myosin heads undergo a cycle during which they attach to thin filaments, exerting a tension, and then depending on the load, perform a power stroke that causes the thin filaments to slide past, shortening the muscle.

Muscle fibril structure is measured from micrometers to several millimeters in length. These fibril structures are bundled together to form muscles. Myofibril proteins are the largest group and probably more is known about these proteins than any other. In muscle cells actin is the scaffold on which myosin proteins generate force to support muscle contraction. Myosin is the major protein that is extracted from the muscle cells by mechanical means.

An important purpose of tumbling and massaging is to solubilize and extract myofibril proteins to produce a protein exudate on the surface of the meat fiber. The exudates bind the formed pieces together upon heating. Binding strength also increases with increased massaging or blending time. This is due to increased exudate formation on the surface of the meat. Crude myosin extrudate is increased with increased blending time.

Grinding/chopping utilizes the concept of rupturing the cell to release protein. This mechanical chopping or shearing takes place at the shear/fill plate hole. This process extracts actin and myosin from muscle cells.

Mixing, utilizes friction and kinetic energy to release protein exudate. Fill hole shape and spacing can cause dead spots and turbulence in the meat flow. This change of direction is a form of mixing and massaging. This is another process, which extracts actin and myosin from muscle cells.

Massaging, utilizes friction, kinetic energy and pressure to increase protein exudate. This action takes place almost anywhere meat comes in contact with processing equipment and is moved or has a change of direction via pressure. This is also a procedure which involves extracting actin and myosin from muscle cells.

Meat patties are comprise of whole muscle meat, table trimmings, or LFTB (lean finely textured beef) or a combination thereof.

A grinder/mixer blends the product to either a course grind or a fine grind which creates a finished product. This creates a homogenous mix which is formed into a noodle.

With frozen foods, a flaker can be used which first flakes the frozen food and then it is ground in a grinder/mixer/blender.

SUMMARY OF THE INVENTION

The present invention relates to orifices machined into the grinder plate that creates fiber orientation of the meat, and stretching of the product fibers. It is an object of the present invention for the fibers while aligned and stretched, to pass through the orifices at such high velocity that the fibers are sheared at the desired length.

It is an object of the present invention to install a set of independent speed controlled blades on the outside of the grinder plate. It is an object of the present invention to use the orifice machined holes that control fiber orientation. It is an object of the present invention for the grinder to extrude the product, accelerate the product through the orifices, resulting in fiber alignment and stretching while allowing the outside blades the opportunity to shear the fibers to any length desired. Having the fibers in the stretched aligned state at the exit of the orifices is the only point for shearing them. It is an object of the present invention to have an independent set of blades that can be controlled for speed that allows fiber length control.

The present invention relates to an independent knife assembly, with variable speed control, for shearing fibers affected by the orifices.

It is an object of the present invention to provide an outboard or external knife assembly for a grinder.

It is an object of the present invention to provide an outboard or external knife assembly for stuffers, or any other meat extrusion machine or device.

It is an object of the present invention to provide independent speed control of the outboard or external knife assembly. It is an object of the present invention for the device to be driven by hydraulic, electric, pneumatic, or any other energy transfer system.

It is an object of the present invention for the knives spinning drum to have a gear driven, belt driven, chain driven, or any other method to transfer energy to the knives spinning drum.

It is an object of the present invention for the device to be attached via a thread, slip joint with retainer pin, clamp collar, as presently shown in the drawings, an interrupted thread, flange with bolts, a "U" shaped slip socket with locking cams or bolts.

It is an object of the present invention to for the knife used to be a standard off the shelf configuration. It is an object of the present invention for the knife to be redesigned as needed for different applications. It is an object of the present invention for the knife to be a knife insert. It is an object of the present invention for the knife to have a thickness equal or smaller than the diameter of the holes. This will prevent the knife from windowing the orifice completely shut, thus blocking the flow and pulsing the meat.

During the start and stop of meat flow, the cylinder needs to clear itself before the venturi action can take effect. It is an object of the present invention for the spherical portion of the orifice to be shorter in length than the cylinder portion or exit of the holes.

It has been shown that there is a relationship between the ratio of the length of the spherical portion and the cylinder portion. The venturi effect when subject to a start and stop action or pulsed flow performs better with a long spherical portion and a short cylinder by ratio.

It is an object of the present invention for the drum device to have a scraper assembly. The scraper assembly keeps meat from tumbling like a clothes dryer, moving the meat out so that there is a lower contact time with the drum. It directs the meat in a controlled fashion and acts as a safety device in case the device is not installed properly.

It is an object of the present invention for the drive part of the knife ring to utilize three square notches with three raised tabs.

The present invention comprises an apparatus for grinding meat. The meat grinder includes a pump for pumping meat particles in a continuous flow under high pressure. This meat is pumped into the inlet port of a collection chamber that has a frusto-conical shape with the outlet port having a larger diameter. A grinder plate is disposed at the outlet port of the collection chamber with a plurality of holes disposed therein for reducing the diameter of the particulate size of the meat as the meat is pressed there through. A cutting knife is disposed adjacent the grinder plate for reducing the length of the particulate matter output from the grinder plate. A variable motor is attached to the cutting knife for moving the cutting knife perpendicular to the surfaces in the grinder plate. The variable motor has a variable speed such that the length of the particulate matter output from the grinder plate is varied depending upon the particular application.

In accordance with another embodiment of the present invention, the variable motor is a hydraulic motor with an external pump for providing the hydraulic pressure thereto. This hydraulic motor has a continuously variable speed to rotate the cutting knife at a variable rotation speed. By varying the rotation speed of the knife, the length of the particulate size pressed through the grinder plate can be determined for a desired particulate size.

In an embodiment, the grinder via its auger conveys meat through the grinder plate. The outer knife cuts the meat again. The speed of rotation of the blade effects fiber length. The speed is adjustable via a speed control device connected to the motor. The motor drives the outer knife by a drive that is mechanically connected from the input shaft to the outer drive knife hub. The contact of the external knife to the grinder plate is adjusted by the outer knife pressure tension ring assembly.

It is an object of the present invention to provide fiber orientation technology to reduce the release and mixing of myosin with actin. It is an object of the present invention for the fiber orientation technology to control orientation of the fiber. It is an object of the present invention for the fiber orientation technology to provide less myosin activity resulting in a better bite/bind and control over the final cook shape.

The present invention relates to an apparatus and method for accelerating food product in order to cause the product to be stretched, aligning the fibers of the product. It is an object of the present invention for a hole or orifice to change size from a larger to a smaller diameter with vertical or concave sides. It is an object of the present invention for the sides to have a sharp edge. The principle has design similarities to a venturi. It is referred to as a nozzle, venturi, orifice, or a restriction to flow which results in product acceleration with a corresponding pressure drop through the orifice.

By reducing the diameter of a tube through which a substance passes, the velocity is increased. This is the principle of Conservation of Mass. When the velocity increases the pressure of the material is reduced. This is the principle of Conservation of Energy.

For every liquid, there is a ratio between the cross-sectional area (C) and the cross-sectional area (c) through which velocity can only be increased by reducing temperature or increasing pressure. Although ground meat is not a homogeneous liquid, the same concepts still apply. It is impossible to attain a venturi effect unless there is a transition between the orifices and the small orifice has a finite length. There is a ratio of length between the cylinder and sphere that effects performance. A shorter length of the cylinder as compared to the length of the spherical section effects the performance of the velocity and alignment.

A venturi allows a smooth transition from a larger orifice to a smaller one. This transition minimizes flow transitions and thereby reduces restrictions in the system. The transition minimizes energy loss and supports fiber alignment.

The transition in a venturi is extremely difficult to create in a production tooling environment. As a result, using the geometric properties of a sphere or similar shape allows the ability to obtain many of the venturi effect properties using standard production practices.

All points on a sphere are the same distance from a fixed point. Contours and plane sections of spheres are circles. Spheres have the same width and girth. Spheres have maximum volume with minimum surface area. All of the above properties allow meat to flow with minimum interruptions. There are no static or dead zones. No matter what angle the cylinder intersects the sphere, the cross section is always a perfect circle.

It is an object of the present invention to increase meat velocity forcing linear fiber alignment.

It is an object of the present invention to have spherical geometry or a similar shape in grinder plate or orifice plate apertures to create venturi effects.

The present invention relates to a grinding machine which has a hopper into which the material to be ground is placed. The grinding machine further comprises a grinder portion, including a grinding head, a mounting ring, a bridge, a collection tube, an auger or feed screw, and a barrel. A feed screw is located in the grinding head to advance material in the hopper through the head. A knife assembly is mounted at the end of the feed screw and rotates with the feed screw in combination with the orifice plate or grinder plate. This grinds the material that is advanced toward the orifice plate by the feed screw. The feed screw has a bore at its downstream end into which a center pin is inserted. The center pin extends through a central passage of the knife assembly, and through a bushing that is positioned in a central opening of the orifice plate. A collection cone is located downstream of the orifice plate and is secured to the bushing. The orifice plate is comprised of an outer section having a plurality of grinding apertures and an inner section having at least one collection passage. The collection passage or passages of the orifice plate lead to a collection structure defined by the collection cone, which generally includes a collection cavity and a discharge passage. An orifice plate guard is located downstream from the orifice plate and maintains the collection structure in place. A mounting ring holds the guard against the orifice plate and mounts the intervening structures to the body of the grinding head.

The present invention relates to a grinder head for a meat grinding machine. The invention improves fiber alignment. The meat fiber is drawn through the orifices of the grinder plate which stretches the meat fiber. The venturi effect created by the orifice aligns the fiber through the plate. The meat fiber is stretched and allows a clean cut. There is little or no release of myosin.

It is an object of the present invention to get the lowest cross section through the cut of the meat.

It is an object of the present invention for the grinder to grind food product.

This product flow is accelerated by using a system which reduces the cylinder size. Using the equation from Bernoulli's law of $A_1V_1=A_2V_2$, the velocity is increased by reducing the cross sectional area.

The typical way of accomplishing this is the use of a venturi nozzle. However, a venturi requires a gradual area reduction and a finite length throat. Given the restrictions of the plate thickness, it was not feasible to put a venturi in a grinder or orifice plate. However, utilizing the properties of a sphere, the product achieves acceleration by intersecting a cylinder with a sphere of a larger diameter.

In a sphere, pressure is equal in all directions. Therefore, when the sphere is intersected by a cylinder, the product will move in a direction coaxial with the cylinder at a high velocity. The impact on the product in the grinder plate is greater because the product moving at a higher velocity will generate more momentum.

It is an object of the present invention to provide a venturi effect in the apertures of the orifice plate by creating a sphere to cylinder apertures. This creates a venturi effect or a venturi pump. This accelerates the product through the orifice. The spherical cut creates equal pressure in all directions. It is an object of the present invention to have a spherical hemisphere or curved structure which has a diameter which is no greater than the choke flow for the liquid, gas, or solid used and is no less than the diameter of the connected cylindrical portion.

It is an object of the present invention for the spherical hemisphere or curved structure to have a diameter between 1.1 to 2.5 times greater than a cylindrical portion which intersects the same. It is preferred to have a sharper edge from the edge to the hole.

It is an object of the present invention to use spherical geometry, with cylindrical intersections, and the ratio of the diameter of the sphere divided by the area of the cylinder to be no greater than the choke flow for the liquid, gas, or solid used and is no less than the diameter of the connected cylindrical section to create conditions to meat flow which maintain improved cell structure.

Irregular shapes do not have diameters, but they do have areas. For a given ratio of a linear item, the ratio becomes the square of the linear ratio. For curved and irregular shapes, the ratio of the initial area and the reduced area is from approximately 1.2 to 6.25.

DETAILED DESCRIPTION OF THE INVENTION

Figure 1:
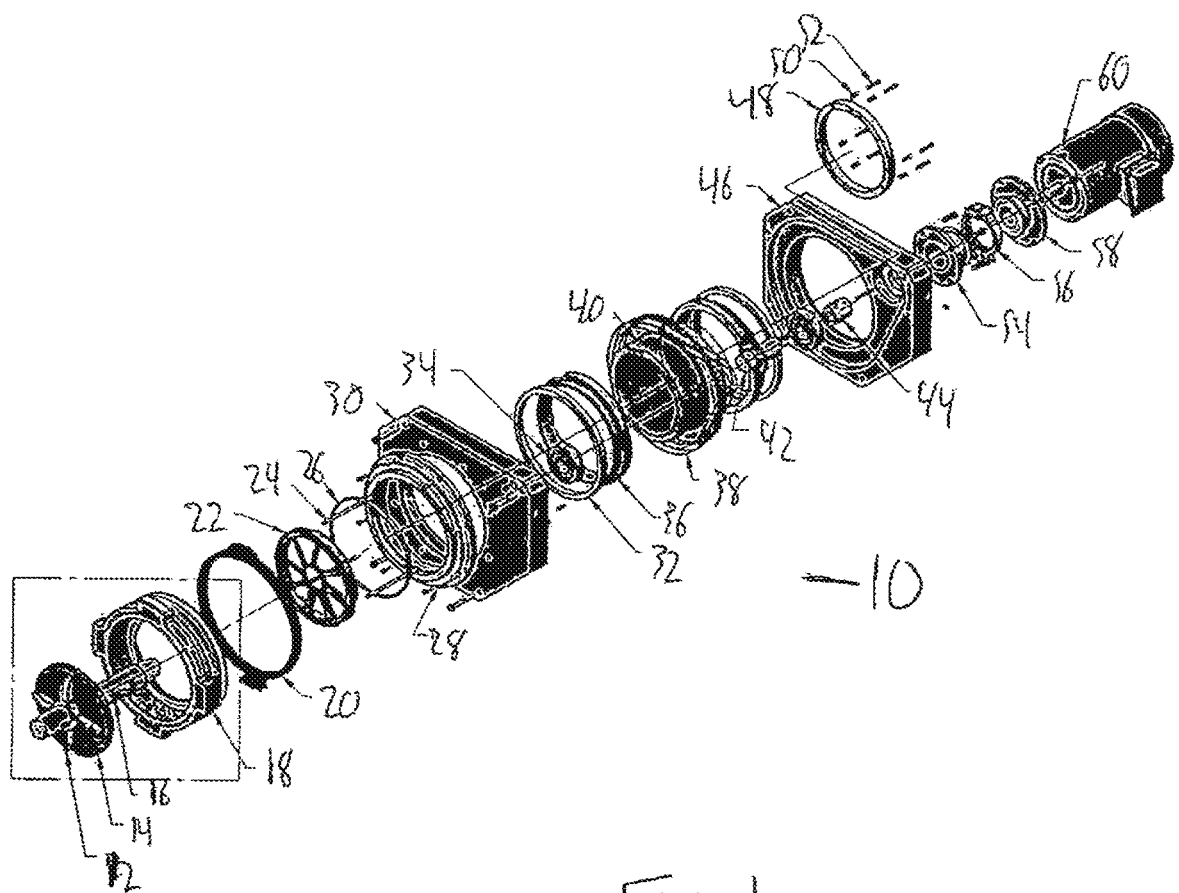
FIG. 1 shows a dissembled view of the grinder outboard knife assembly.

FIG. 1 shows a grinder outboard knife assembly 10 comprising a grinder knife 12, which is a device that has multiple legs (or extensions) from a hub, each of which has edges designed to cut fibers by rotating on a flat surface with multiple orifices.

A grinder plate 14 is a flat disc that has multiple orifices. The grinder plate 14 is the surface upon which the grinder knife rotates.

The bone collector tube 16 is a tube which is attached to the center hub of the grinder plate 14. It creates a path for bone matter to travel so that it is separated from the ground meat.

In an embodiment, the bone collector, which usually uses a ball valve for flow control, is replaced with a fixed insert orifice that has the spherical hole design of the present invention. This allows for easy size change, removal and installation of a different sized orifice. This assists in keeping the flow consistent, the acceleration through the orifice would be self-cleaning, and it would reduce the outside profile allowing for better exit of meat from the drum device.

The grinder plate nut 18 holds the grinder plate 14 to the grinder barrel.

The gear box clamp 20 is a circular locking clamp that affixes the external gear box to the end of the grinder, via the nut 18.

Outer knife 22 cuts meat on the downstream side of the grinder plate 14.

Knife push rod 24, is a bar that allows spring forces to be exerted on the knife 12.

O-ring 26 is an elastomer used either for sealing mating surfaces or can provide a cushioning and spring effect.

Gear box mounting flange 28, is the part of the gear box that allows the gear box clamp 20 to hold the gear box to the grinder. Gear box clamp engages both flange 28 and nut 18 to hold the device on the grinder.

Gear box housing 30, is comprised of left and right housings that are fastened by bolts.

Bearing 32 supports rotation against the gear box housing 30.

Input shaft bearing 34, which is also known as the drive sprocket bearing, facilitates the drive shaft rotating the outer knife 22.

Bearing race 36 is the cover on the outer diameter of the bearing 32 that contains the balls (ball bearing) or rollers (roller bearing).

The knife assembly 10 further comprises a drive chain 38 that transmits the motor force to the external knife.

Outer knife drive hub 40 is the sprocket that is directly driven by the external motor.

Input sprocket shaft 42 transmits the forces from the auxiliary motor to the drive chain 38.

Motor input coupling 44 is attached to the front of the auxiliary motor.

Gear box housing 46 is comprised of a left and right housing that is fastened by bolts.

Outer knife pressure tension ring 48 applies pressure to the outer knife 22 to keep it on the surface of the grinder plate 14.

In a further embodiment, the springs of the device will be internal with no outer ring.

Tension spring 50 creates force to maintain contact between the outer knife 22 and grinder plate 14.

Tension adjust screw 52 adjusts tension from the compressing spring.

Gear box motor flange 54 is a flange to which the motor is attached.

Motor clamp 56 is a clamp that holds the motor 60 to the gear box.

Motor mount flange 58 is the flange attached to the gear box.

Adjustable speed motor 60 is an electric motor with an inverter drive.

In an embodiment, the grinder knife is installed into the end of the grinder auger. The grinder plate has a plurality of holes that have a spherical component and a cylindrical component. The grinder plate and the grinder knife are assembled to the end of the grinder by a grinder plate nut. The grinder plate nut is assembled to the grinder by a screw thread. The outer knife is assembled to three knife push rods. The gear box mounting flange is assembled to the LH gear box housing. An O-ring is inserted into the gear mounting nut flange to prevent meat leakage.

The bearing and the bearing race are assembled to the outer diameter of the outer drive hub. The outer drive hub has sprocket teeth to accept the drive chain. There is a second bearing and bearing race that fit over the outer knife drive hub and into the gear box housing RH.

There are two input shaft bearings that are assembled to the gear box assembly. The input sprocket shaft is aligned to the outer knife drive hub. The motor input coupling facilitates the motor to drive the assembly. After the gear box assembly is finished then the outer knife with the 3 knife push rods is pushed through the gear box assembly. The three tension springs, one for each rod, are assembled to holes in the gear box housing assembly. The outer knife pressure tension ring is assembled with the tension adjusting screw to provide for tension adjustment.

The entire assembly is affixed to the grinder plate nut by an attachment flange on the nut and a similar flange on the gear box mounting flange. These are attached by the gear box clamp. The gear box motor flange is assembled via three bolts. The motor flange is assembled to the front of the motor.

The motor is affixed to the gear box by the motor clamp that is similar in function to the gear box clamp. The motor is electrically connected to a speed control device.

The bone collector tube is affixed to a hub on the grinder plate.

Figure 2:
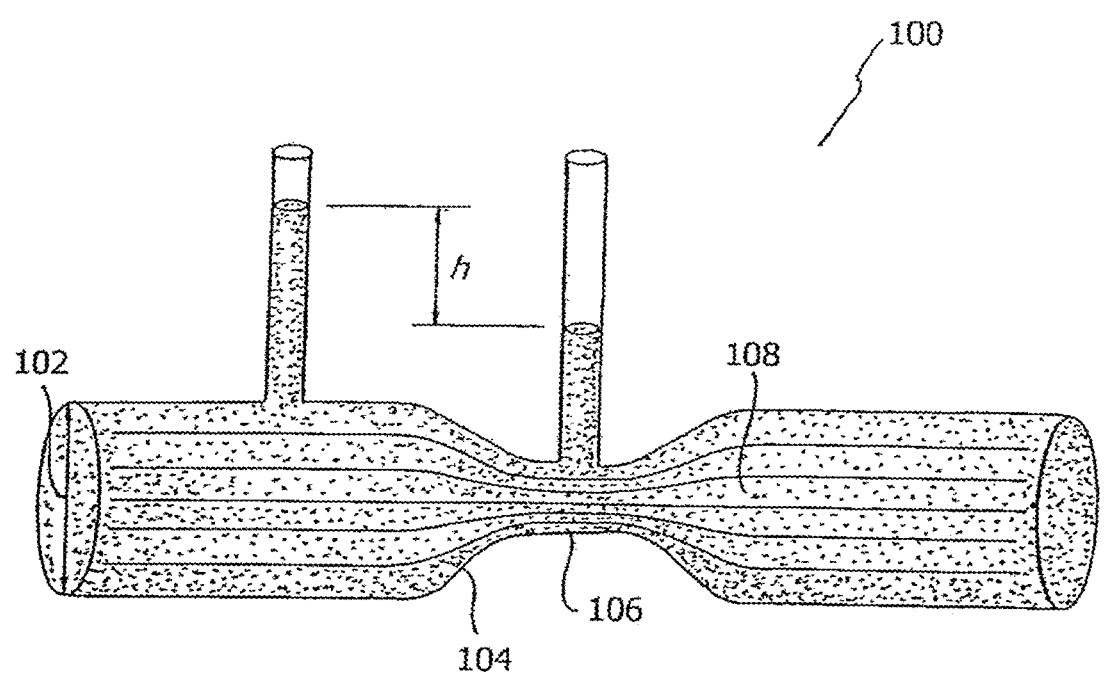
FIG. 2 is an illustration of a prior art venturi design.

FIG. 2 shows a prior art venturi 100 comprising a diameter 102, angle transition 104, throat length 106 and discharge 108.

Figure 3:
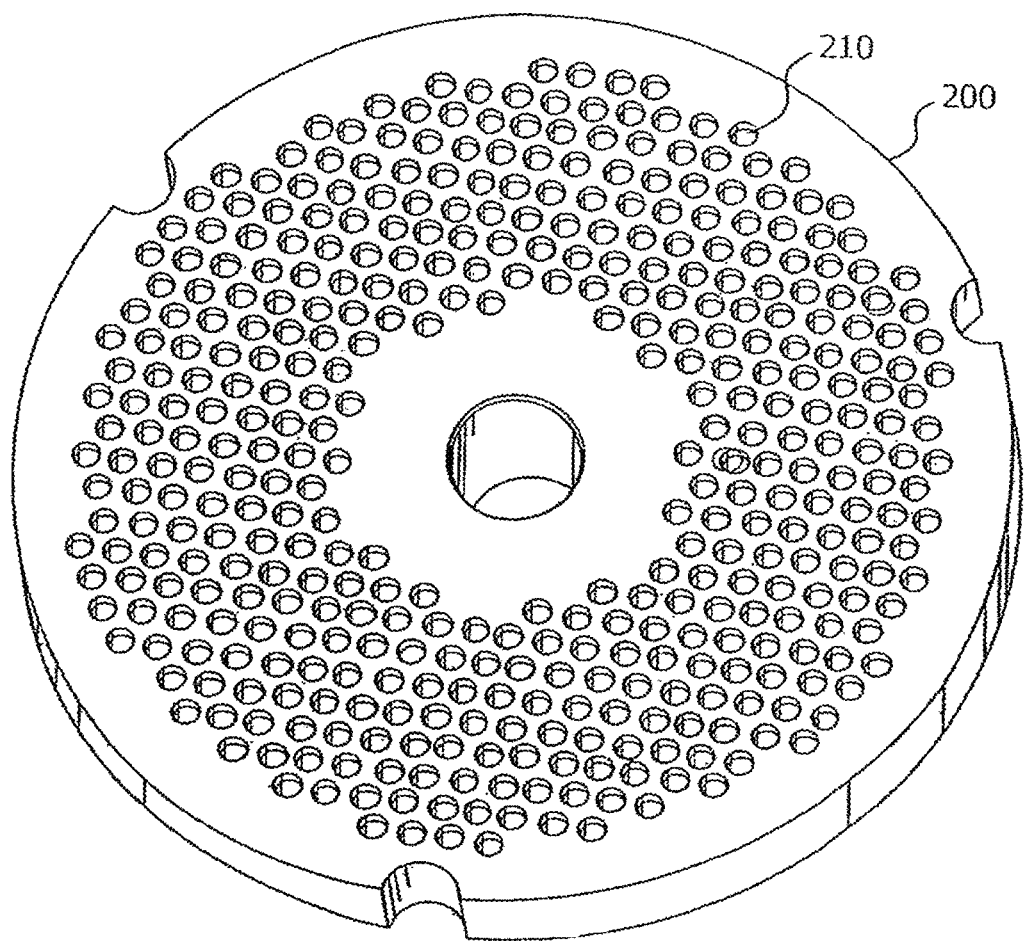
FIG. 3 is a top view of an embodiment of an orifice or grinder plate of the present invention.

FIG. 3 shows an orifice plate 200 having apertures 210.

Figure 4:
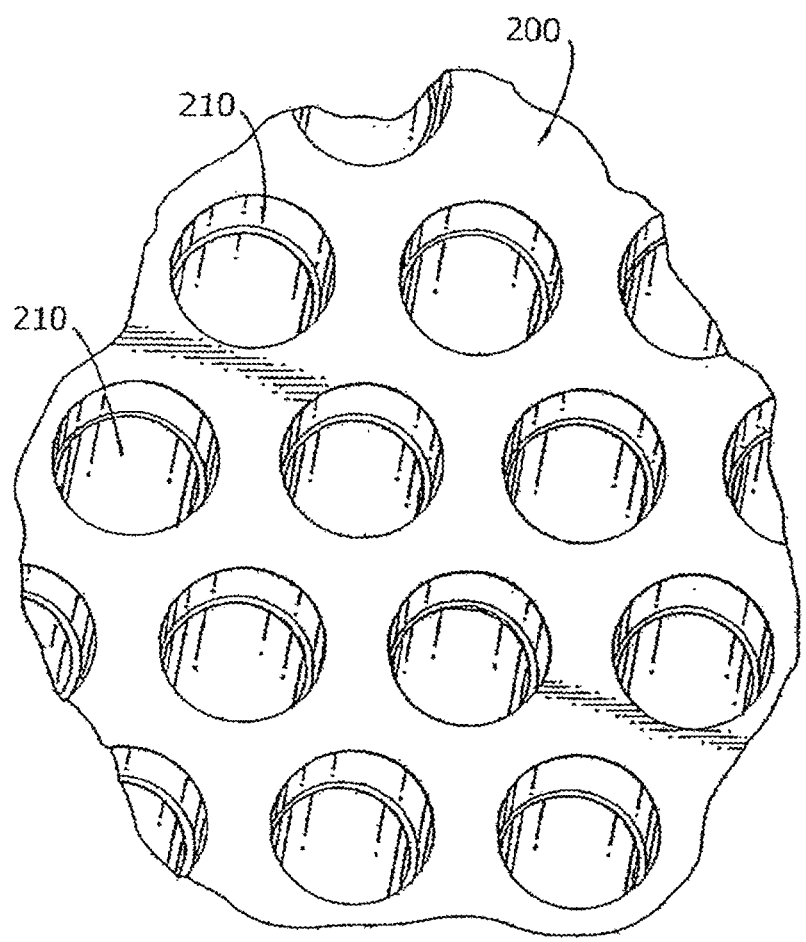
FIG. 4 is a magnified top view of an embodiment of an orifice or grinder plate of the present invention. As shown in this embodiment, the spherical portion is shorter compared to the exit cylinder length.

FIG. 4 shows a magnified view of the orifice plate 200 showing the apertures 210.

Figure 5:
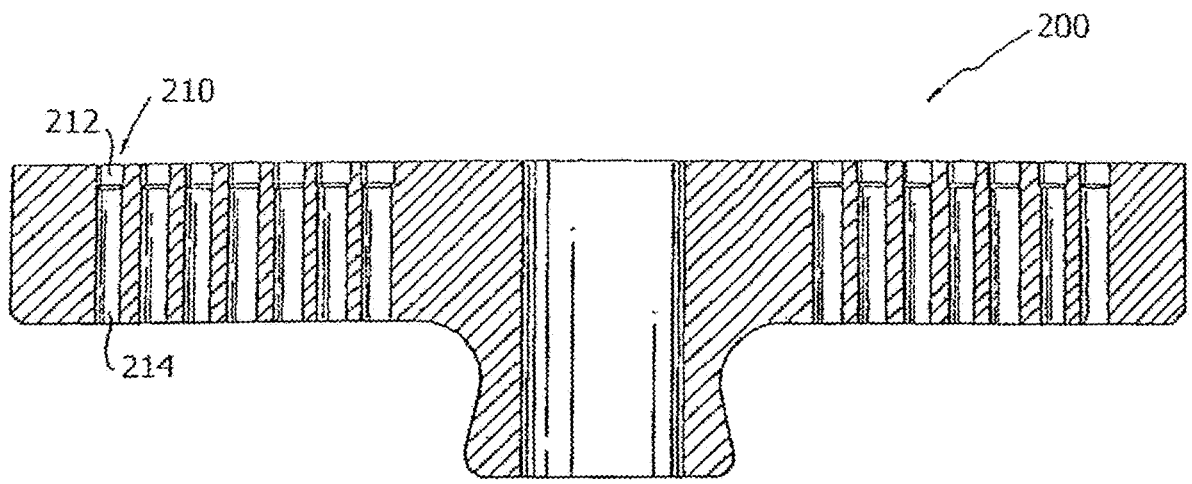
FIG. 5 is a cross sectional side view of an embodiment of an orifice or grinder plate of the present invention. As shown in this embodiment, the spherical portion is shorter compared to the exit cylinder length.

FIG. 5 shows the orifice plate 200 having the apertures 210. The apertures comprising a sphere section 212 and a cylinder section 214.

Figure 6:
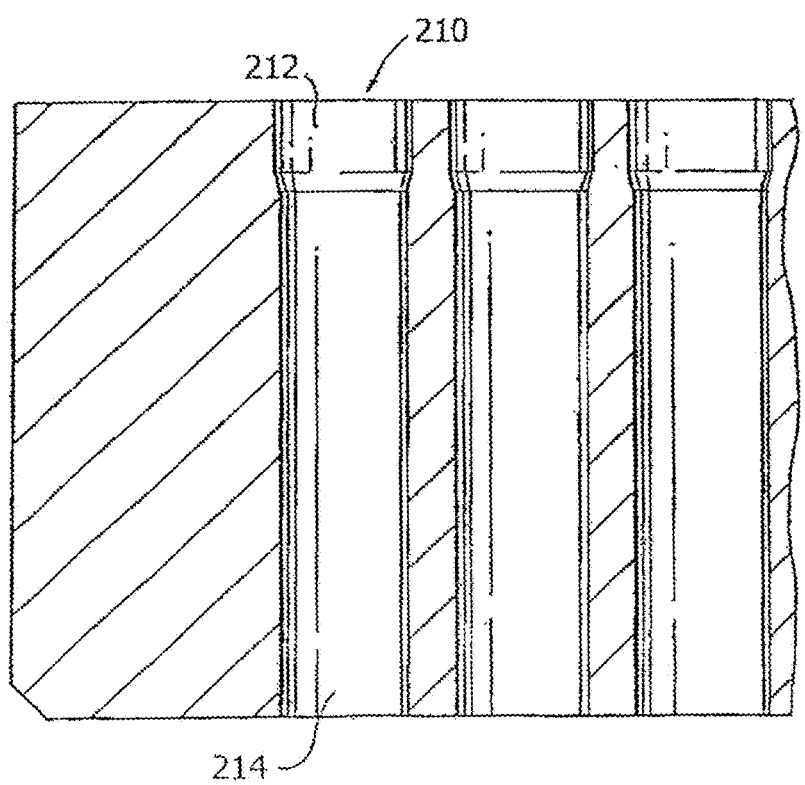
FIG. 6 is a magnified cross sectional side view of an embodiment of an orifice or grinder plate of the present invention. As shown in this embodiment, the spherical portion is shorter compared to the exit cylinder length.

FIG. 6 shows a magnified view of the apertures 210 having a spherical section 212 and a cylinder section 214.

Figure 7:
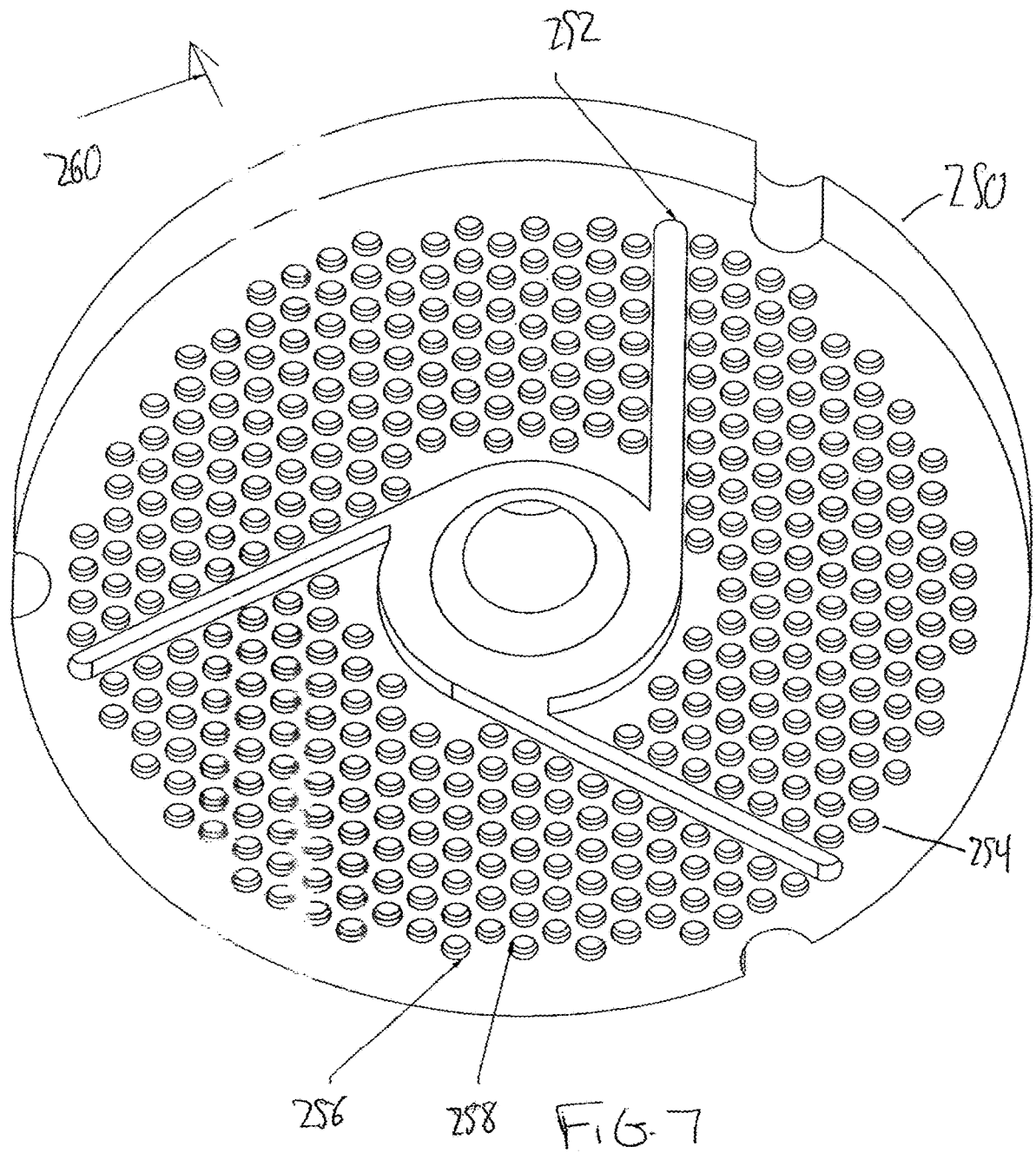
FIG. 7 is a top view of a grinder plate of the present invention.

FIG. 7 shows a grinder plate 250 having a bone collection slots 252, and orifices 254 which are comprised of a spherical diameter 256 and a cylindrical diameter 258. The arrow 260 shows the direction of the meat flow.

The present invention relates to fiber orientation technology. The fiber orientation technology drops pressure across the grinder plate, aligns the fibers of meat so that the contraction of the muscle fiber that does take place is in a direction of choice controlling both bite and shrinkage. The fiber orientation technology provides a lower resistance to product flow.

The fiber orientation technology provides a better shear surface for a cleaner cut. The fiber orientation technology aligns the fibers in the grinder plate so the shearing action disrupts as few muscle cells as possible. The fiber orientation technology decreases the total area of grinder plate blocking the meat flow resulting in less direction change to the product which works the meat. The fiber orientation technology pulls the meat fiber through the apertures of the grinder plate instead of pushing using the principles of the venturi/choke plate.

All of these characteristics of fiber orientation technology reduce the release and mixing of myosin with actin, the net effect is a controlled orientation of the fiber, less myosin activity resulting in a better bite/bind and control over the final cook shape. Spherical geometry in apertures of the grinder plate creates venturi effects.

The grinder plate has a multiplicity of fill orifices distributed in a predetermined pattern. The orifices consist of spherical intersections or a curved structure intersecting a cylindrical section. The spherical section or curved structure has a diameter no greater than the choke flow for the liquid gas or solid used and is no less than the diameter of the connected cylindrical portion. By a reduction in the cross-sectional area a "venturi" condition is created. By using spherical sections or a curved structure, intersections between cylinder and spheres or curved structures create transitions which can be manufactured whose geometry approaches a venturi style system. It is preferred to have a sharper edge from the edge to the hole. To get a perfect edge it is preferred to sharpen with a grinder. In a preferred embodiment, the grinder plate is chrome coated.

Using conservation of mass and conservation of energy principles the volume rate of flow must be equal at all points in the systems. $(\rho_1 A_1 V_1) = (\rho_2 A_2 V_2)$. Since $\rho$ is a constant, velocity is inversely proportional to cross sectional area. Also, a venturi requires a ramp of some finite distance and a throat which also has a finite distance.

A spherical geometry feeding into a circular cross section which creates a product velocity increased while maintaining more consistent pressure on the meat. A sphere has the following properties:

All points on a sphere are the same distance from a fixed point.

Contours and plane sections of spheres are circles.

Spheres have the same width and girth.

Spheres have maximum volume with minimum surface area.

These properties allow meat to flow with minimum interruptions. There are no static or dead zones.

No matter what angle the cylinder intersects the sphere; the cross section is always a perfect circle.

Pressure inside of a sphere is uniform in all directions.

When meat is passed through a circular cross section of a sphere, the fact that pressure is uniform in a sphere creates forces which will be coaxial with the sphere. The reduction in area accelerates the meat through the cylindrical section of the fill plate. The acceleration has been shown empirically to align fibers in the primary direct of flow. Hence, there is fiber orientation.

The invention claimed is:

1. A grinding machine comprising:
   a grinder portion;
   a feed screw or auger to advance material in the hopper through said head;
   independent speed control blades attached to a motor that is independent from said feed screw or said auger;
   said motor providing variable speed control;
   an orifice plate;
   said orifice plate having said independent speed control blades on outside of said orifice plate;
   a collection cone located downstream of said orifice plate;
   said orifice plate comprised of a plurality of grinding apertures and at least one collection passage;
   geometry of each of said grinding apertures create a venturi effect;
   said apertures have a diameter such that ratio of diameter of sphere in said orifice plate to diameter of cylinder of said orifice plate is approximately 1.1 to 2.5.

2. A grinding machine comprising:
   a grinder portion;
   a feed screw or auger to advance material in the hopper through said head;
   independent speed control blades attached to a motor that is independent from said feed screw or said auger;
   said motor providing variable speed control;
   an orifice plate;
   said orifice plate having said independent speed control blades on outside of said orifice plate;
   a collection cone located downstream of said orifice plate;
   said orifice plate comprised of a plurality of grinding apertures and at least one collection passage;
   geometry of each of said grinding apertures create a venturi effect;
   wherein said apertures of said orifice plate utilize intersection of a sphere with a cylinder in order to create a cross section which represents said venturi orifice.

3. The grinding plate of claim 2 wherein said sphere is shorter in length than said cylinder.

4. A grinding machine comprising:
   a grinder portion;
   a feed screw or auger to advance material in the hopper through said head;
   independent speed control blades attached to a motor that is independent from said feed screw or said auger;
   said motor providing variable speed control;
   an orifice plate;
   said orifice plate having said independent speed control blades on outside of said orifice plate;
   a collection cone located downstream of said orifice plate;
   said orifice plate comprised of a plurality of grinding apertures and at least one collection passage;
   geometry of each of said grinding apertures create a venturi effect;
   wherein said apertures of said orifice plate change size from a larger to a smaller diameter with vertical or concave sides having a sharp edge.

* * * * *